United States Patent [19]

Hibler, Jr. et al.

[11] Patent Number: 5,154,202
[45] Date of Patent: Oct. 13, 1992

[54] LOW FORWARD PRESSURE BURST-HIGH BACKPRESSURE RESISTANT RUPTURE DISC

[75] Inventors: Donald R. Hibler, Jr., Bates City; Eddie R. Malcolm, Independence; Earl D. Miller, Jr., Blue Springs, all of Mo.

[73] Assignee: Fike Corporation, Blue Springs, Mo.

[21] Appl. No.: 704,795

[22] Filed: May 23, 1991

[51] Int. Cl.$^5$ .................. F16K 17/40; F04B 49/00
[52] U.S. Cl. .................. 137/68.1; 137/569; 417/308; 417/309
[58] Field of Search .................. 137/68.1, 569, 566; 220/89.2; 417/307, 308, 309

[56] References Cited

U.S. PATENT DOCUMENTS

| | | | |
|---|---|---|---|
| 1,873,045 | 8/1932 | Saathoff | 137/566 X |
| 3,091,359 | 5/1963 | Wood | 220/89.2 |
| 3,746,027 | 7/1973 | Elliott | 137/569 X |
| 4,479,587 | 10/1984 | Mundt et al. | 220/89.2 |
| 4,505,180 | 3/1985 | Hinrichs | 220/89.2 X |
| 4,512,491 | 4/1985 | DeGood et al. | 137/68.1 X |
| 4,795,051 | 1/1989 | Ou | 137/68.1 X |

Primary Examiner—John Rivell
Attorney, Agent, or Firm—Hovey, Williams, Timmons & Collins

[57] ABSTRACT

A fluid pressure relief assembly for a system operating under an elevated pressure includes a support structure having means defining a bore therethrough of desired cross-sectional configuration, the support structure being provided with a shoulder extending transversely into the bore and presenting a peripheral abutment surface which divides the bore into a first zone an a second zone. The assembly further includes a bidirectional relief means having a central frangible section, and means mounting the relief means across the bore of the support structure in normal flow blocking relationship thereto. A peripheral portion of the central frangible section is disposed to engage the shoulder for support thereby. The central portion of the frangible section within the innermost margin of the shoulder is constructed to undergo rupture only when the pressue in the first zone exceeds the pressure in the second zone by a preselected first magnitude. The peripheral portion of the frangible section which engages the shoulder includes means causing the frangible section to rupture when the pressure in the second zone exceeds the pressure in the first zone by a preselected second magnitude, and means extending around a substantial part of the circumferential extent of the peripheral portion for increasing its structural integrity. A method for constructing a fluid pressure relief assembly for a system operating under an elevated pressure is also disclosed. Also disclosed is an embodiment of the invention wheren the relief means is unidirectional.

24 Claims, 3 Drawing Sheets

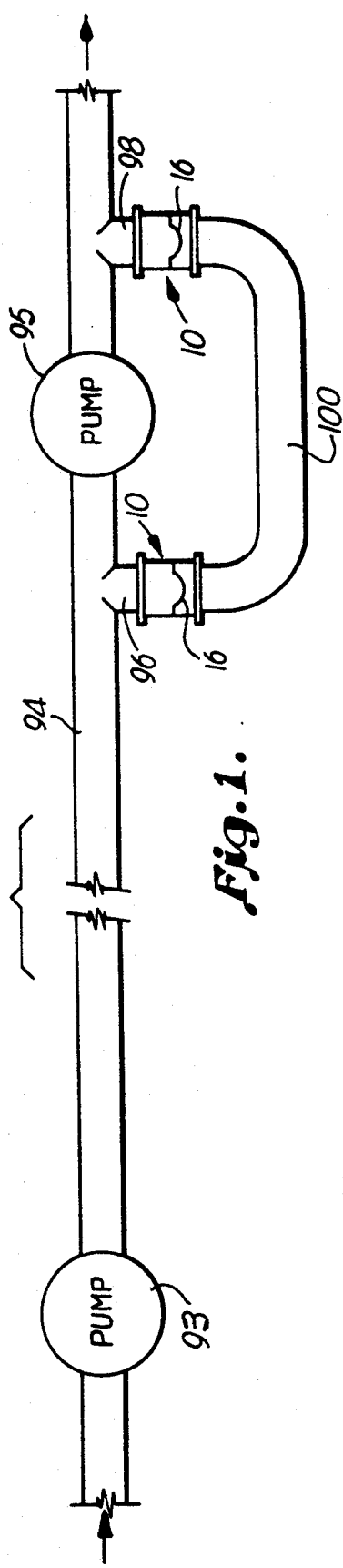
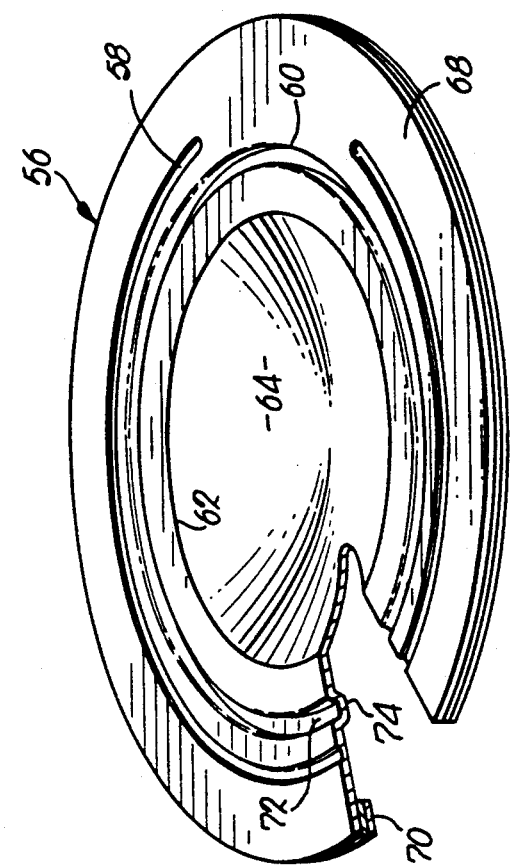
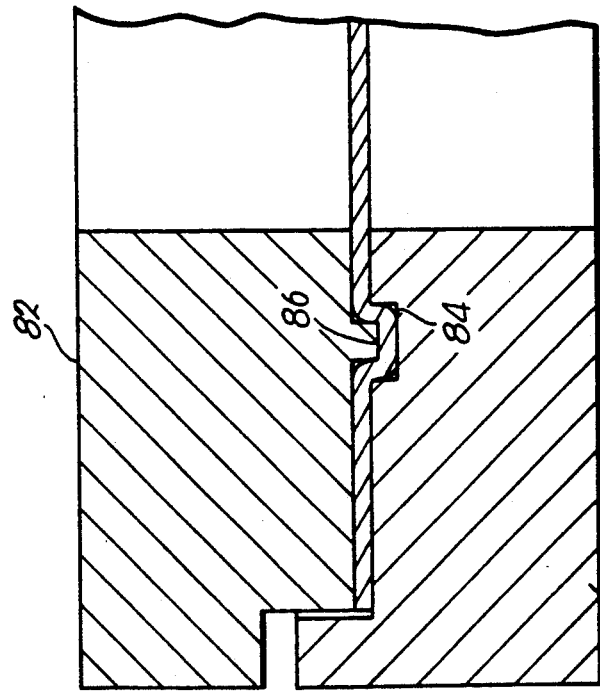

LOW FORWARD PRESSURE BURST-HIGH BACKPRESSURE RESISTANT RUPTURE DISC

BACKGROUND OF THE INVENTION

1. Field of the Invention

The present invention relates generally to a two directional pressure relief assembly for use in a fluid transportation system, and in particular to a method and apparatus for providing a safety pressure relief device in either of two directions wherein means for alternatively weakening and strengthening are applied to a rupture disc. The pressure relief assembly includes means for mounting the rupture disc in such manner that the strengthening element of the disc is rendered additional support. The pressure relief assembly provides for resistance against bursting from very high fluid pressure in a first direction, while facilitating bursting from a much lower fluid pressure in a second direction.

2. Discussion of the Prior Art

It is known to provide a two directional pressure relief assembly for use in some fluid pressure environments. For example, a two directional pressure relief assembly may be used in a fluid reactor system, such as a chemical reactor system or the like. In such a situation, it is usually necessary to provide a safety device coupled to the reactor vessel to prevent a critical condition from occurring in the reactor vessel. The critical condition usually encountered in such an environment is an abnormal overpressure within the reactor vessel, with the safety device operable to relieve the overpressure to prevent catastrophic failure.

In the circumstances above described, it has been common practice to use a conventional single rupture disc designed to burst at a predetermined pressure. It was appreciated, however, that in many reactor systems it is necessary not only to provide emergency relief to prevent an overpressure from occurring, but also to prevent an underpressure from occurring. The initial solution to the problem presented by an environment presenting both overpressures and underpressures was to provide two conventional single rupture disc assemblies, one such assembly operable in each pressure situation. From this evolved a single assembly having two rupture discs mounted in the relief passageway connected to the reactor vessel.

Existing bidirectional relief systems as described above operate within a fairly narrow range of overpressures and underpressures. In fluid transportation systems, however, there has been a need for a bidirectional relief system capable of operating in a much wider range of pressures. In fluid transportation environments, such as may be utilized to transport a slurry of water and some particulate matter, such as coal or other ore, the concern to be addressed is the situation presented by the failure of one high pressure pump in a series of such pumps. It is common to provide a pressure relief circuit in connection with each pump in a fluid transportation system, such as will allow continuous forward flowing of the fluid being transported around the failed pump. These relief circuits are preferably designed so that there is one relief passageway upstream of each pump connected to a second relief passageway downstream of each pump, with a rupture disc disposed across the bore of each relief passageway. Each such rupture disc must be capable of withstanding the high backpressure normally present in the fluid transportation system while all pumps are operating. Should a pump fail, however, the upstream rupture disc is naturally designed to burst at a predetermined backpressure above the normal magnitude, so as to allow the fluid to enter the safety circuit, thus preventing damage to upstream pumps that continue to function. It is of course desirable that the rupture disc at the relief passageway downstream of the failed pump be designed to rupture at a much lower forward pressure, so that there is no delay in routing the fluid material back into the main fluid passageway after the upstream rupture disc has given way. Thus, the need has existed for a bidirectional relief system capable of withstanding very high backpressure, but also capable of rupturing at a significantly lower forward pressure.

As noted above, existing bidirectional relief systems operate in a relatively narrow range of overpressure and underpressure in fluid reactor systems. In a fluid transportation system as above described, however, the normal backpressure may be as much as 2200 psi. Nevertheless, in such an application, it is very desirable that the downstream disc in a safety by-pass loop be adapted to burst at a much lower forward pressure, on the order of 1000 psi. The purpose of this, of course, is to allow the fluid to flow freely as quickly as possible before damage occurs to upstream pumps.

Presently existing bidirectional pressure relief assemblies have further disadvantages. Such assemblies normally utilize two rupture discs with a sealing membrane disposed therebetween. This configuration is expensive to design and manufacture, particularly when considered in comparison to costs associated with an assembly having only a single rupture disc, such as is provided by the present invention.

SUMMARY OF THE INVENTION

It is an object of the present invention to provide a fluid pressure relief assembly for a system operating under an elevated pressure wherein the assembly has a support structure including means defining a bore therethrough of desired cross-sectional configuration. The support structure is provided with shoulder means extending transversely into the bore, presenting a peripheral abutment surface which divides the bore into a first zone and an adjacent second zone.

Another object of the present invention is to provide a bidirectional relief means having a central frangible section, and means mounting the relief means across the bore of the support structure in normal flow blocking relationship thereto.

It is yet another object of the present invention to provide a peripheral portion of the frangible section of the relief means, the peripheral portion being disposed to engage the shoulder for support thereby.

A further object of the present invention is to provide a central part of the relief means frangible section within the confines of the innermost margin of the shoulder, the central part being constructed to rupture when the pressure in the first zone exceeds the pressure in the second zone by a preselected first magnitude.

Another object of the present invention is to provide the peripheral portion of the relief means frangible section with means causing the frangible section to rupture when the pressure in the second zone exceeds the pressure in the first zone by a preselected magnitude.

Yet another object of the present invention is to provide the peripheral portion of the relief means frangible section with means extending around a substantial part of the circumferential extent of the peripheral portion for increasing the structural integrity of the peripheral portion.

In accordance with the present invention, a fluid pressure relief assembly for a system operating under an elevated pressure may be constructed, beginning with the fabrication of a relief means or rupture disc. The rupture disc may be generally formed by cutting a section of desired material, preferably an annealed steel alloy, to a predetermined shape and dimensions. The rupture disc is formed to include a central, frangible section and a supporting, peripheral section circumscribing the frangible section. The central frangible section is strengthened by simultaneously applying pressure to form a central dome and a ridge or rib substantially surrounding the dome, the ridge or rib being situated between the dome and the peripheral section. In this manner, the frangible section is adapted to withstand a selected fluid pressure in a first direction. The central frangible section is also weakened by removing a portion of the starting material to a selected depth and in a predetermined pattern between the ridge or rib and the supporting peripheral section. By this means, the central frangible section is more easily broken in a second direction when subjected to fluid pressure of a second predetermined magnitude. The relief means is then installed in an elongated support structure, in the present application normally a fluid transportation system, wherein the support structure defines a bore for transporting fluid therethrough, and including means for engaging the relief means supporting peripheral section. The relief means is secured transversely of the bore to prevent fluid flow therethrough.

BRIEF DESCRIPTION OF THE DRAWINGS

A preferred embodiment of the invention is described in detail below with reference to the attached drawing figures, wherein:

FIG. 1 is a schematic of a fluid pressure relief assembly for a system operating under an elevated pressure, constructed in accordance with the preferred embodiment;

FIG. 2 is a side elevation view of the rupture disc of the pressure relief structure of the present invention, illustrating the formation thereof in a manufacturing die;

FIG. 3 is a perspective view of a rupture disc of the relief structure of the present invention, with a portion thereof broken away to show detail, illustrating the relative dimensions.

DETAILED DESCRIPTION OF THE PREFERRED EMBODIMENT

Figure 5:
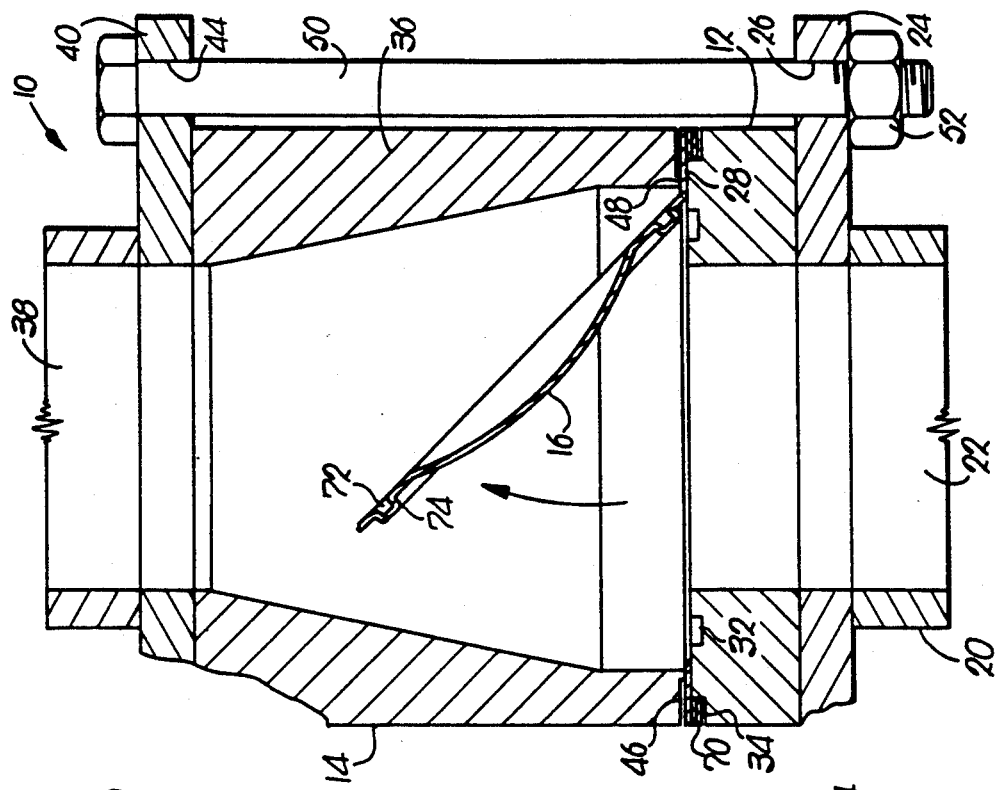
FIG. 5 is a vertical sectional view of the fluid pressure relief assembly of the present invention, after rupture resulting from excessive backpressure.

Referring now to the drawings, a fluid pressure relief assembly 10 for a system operating under an elevated pressure in accordance with the present invention broadly includes a first support structure 12, a second support structure 14 and a relief means 16 operably mounted between the first and second support structures 12, 14. Preferably, the support structure 12 is operatively coupled to a fluid transportation system by a suitable duct structure, while the support structure 14 is operatively coupled to communicate with a relief conduit.

Figure 4:
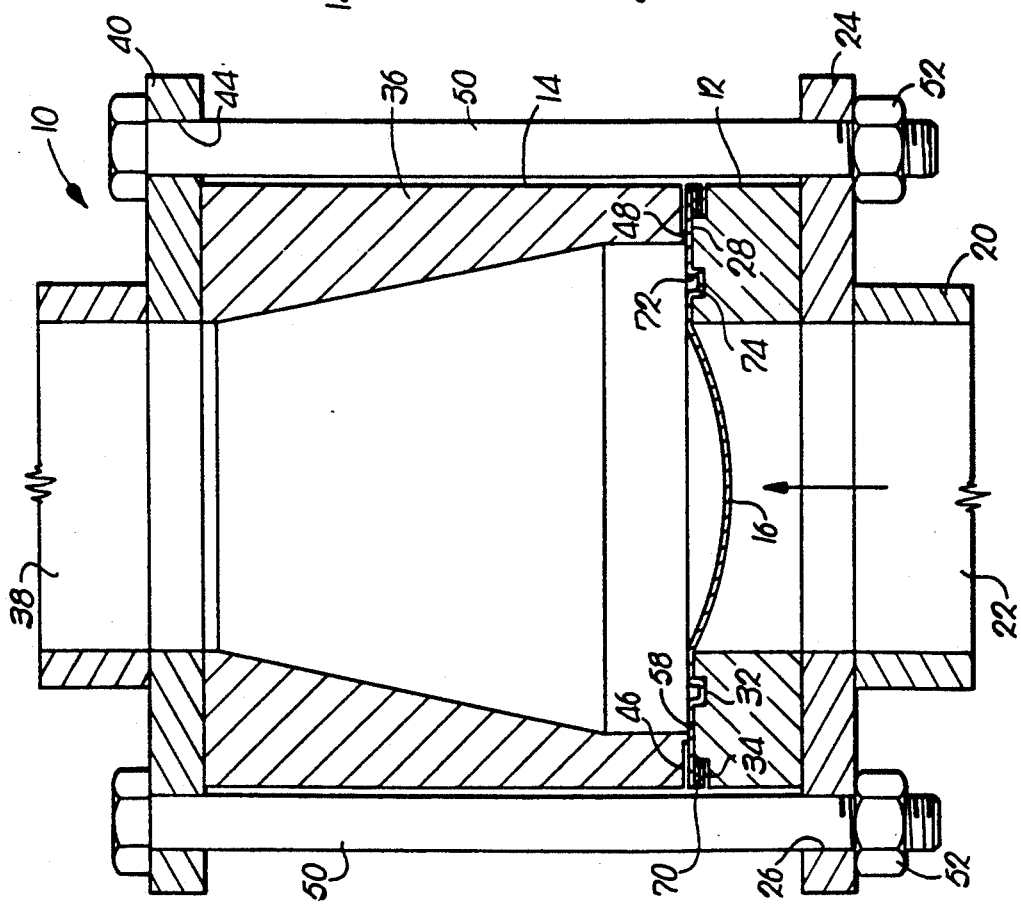
FIG. 4 is a vertical sectional view of the fluid pressure relief assembly of the present invention.

In more detail, the first support structure 12 includes a tubular body 20 defining a circular in cross-section bore 22 therethrough. Further, the support structure 12 includes an annular shoulder 24 extending radially outward from the tubular body 20. The shoulder 24 includes a plurality of apertures 26 extending therethrough, as shown in FIGS. 4 and 5. The support structure 12 presents a flange 28 at the distal end thereof. The flange 28 includes a first recess 32 and a second recess 34.

The second support structure 14 is similar in most respects to the first support structure 12 and includes a tubular body 36 defining a circular in cross-section bore 38 therethrough. As is apparent from the drawings, the bore 38 may have a larger diameter than the bore 22 of the support structure 12.

An annular shoulder 40 forms a part of the tubular body 36 at the distal end thereof, extending radially outward therefrom. The shoulder 40 presents a plurality of apertures 44 extending therethrough as shown in FIGS. 4 and 5. The support structure 14 also includes an annular groove 46 about the peripheral extent thereof, and an engagement surface 48 for contacting a flange 68 of a rupture disc 56. It will be appreciated that the two support structures 12, 14 are coupled together by means of conventional bolt 50 and nut 52 extending through respectively aligned apertures 26, 44 (see FIGS. 4 and 5).

Turning now to the relief means 16, it will be seen viewing FIG. 3 that the relief means 16 broadly comprises a rupture disc 56. The rupture disc 56 is preferably composed of a suitable material such as an annealed steel. The rupture disc 56 is generally circular and includes a C-shaped line of weakness defining a burst pattern 58. Spaced apart from the burst pattern 58, toward the center of the rupture disc 56, is a strengthening element 60 which in the illustrated example forms a complete circle. The horizontal surface of the rupture disc 56 extends further inwardly from the strengthening element 60 and terminates in a ridge 62 defining a dome 64.

FIG. 3 further illustrates that the rupture disc 56 includes a flange area 68 extending outwardly from the outermost edge of the burst pattern 58 and terminating at the outer circumference of the rupture disc 56. As shown, the obverse side of the flange 68 includes an annular lip 70. Reference to FIGS. 4 and 5 reveals that the annular lip 70 is gauged to fit within the depression 34 of the support element 12, thus facilitating the stability of the relief means 16 when it is situated for operation. In the illustrated example, the strengthening element 60 comprises a depression 72 formed in the surface of the rupture disc 56. FIG. 3 further discloses that the depression 72 is formed with rounded edges 74. This configuration is desirable for facilitating the flexibility of the strengthening element 60, allowing it to deform before breaking under pressure.

FIG. 2 illustrates the use of cooperating female 80 and male 82 dies in the fabrication of the rupture disc 56. In particular, FIG. 2 shows the use of the dies 80, 82 to press the rupture disc 56 in the formation of the strengthening element 60. Careful observation of FIG. 2 discloses that male die projection 86 is not urged into contact with the surface of female die recess 84. Rather, pressure is so applied as to give definition to depression 72, while at the same time creating the rounded lip 74 in the strengthening element 60.

Figure 6:
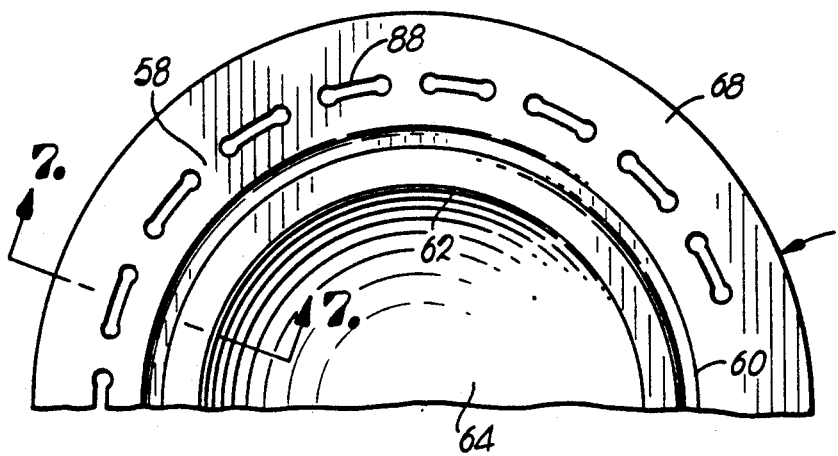
FIG. 6 is a top plan view of a first alternate embodiment of the rupture disc of the fluid pressure relief assembly of the present invention, illustrating an alternate form of the line of weakening.
Figure 7:
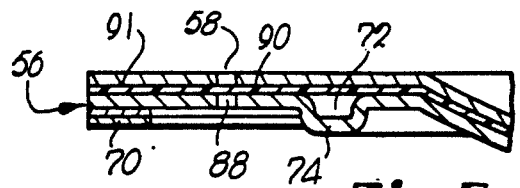
FIG. 7 is a sectional view taken along line 7—7 of FIG. 6.

FIGS. 6 and 7 provide a sectional perspective upon an alternate embodiment of the present invention. In the illustrated example, slots 88 define the burst pattern 58. Whereas in the preferred embodiment illustrated in FIG. 3 the burst pattern 58 is defined by a line of weakness that does not extend through the rupture disc 56, the slots 88 are cut completely through the material forming the rupture disc 56. In this embodiment, a "sandwich" may be utilized to enhance the strength of the rupture disc 56. This "sandwich" is illustrated in FIG. 7, wherein the rupture disc 56 is covered with an adhesive layer of strengthening material 90 which may be a thin sheet of plastic or metal, depending upon the application. In the illustrated example, a final layer of bond material 91 is applied over the strengthening material 90 to additionally bond it to the rupture disc 56.

Figure 8:
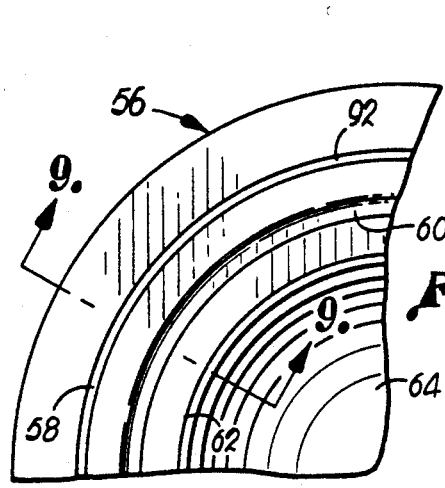
FIG. 8 is a top plan view of a second alternate embodiment of the rupture disc of the fluid pressure relief assembly of the present invention.
Figure 9:
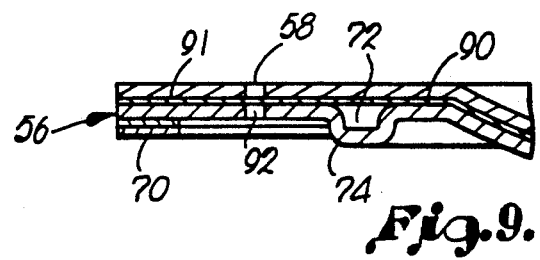
FIG. 9 is a sectional view taken along lines 9—9 of FIG. 8.

FIGS. 8 and 9 depict a second alternative embodiment of the present invention, wherein the burst pattern 58 is defined by an opening 92, which is in essence simply the conversion of the periodic slots 88 depicted in FIG. 6 into a nearly continuous opening. In this instance as well, the rupture disc 56 is overlaid with a sheet of strengthening material 90. As illustrated in FIG. 9, the layer of bonding material 91 is applied over the strengthening material 90 to further secure adhesion thereof to the rupture disc 56.

Figure 10:
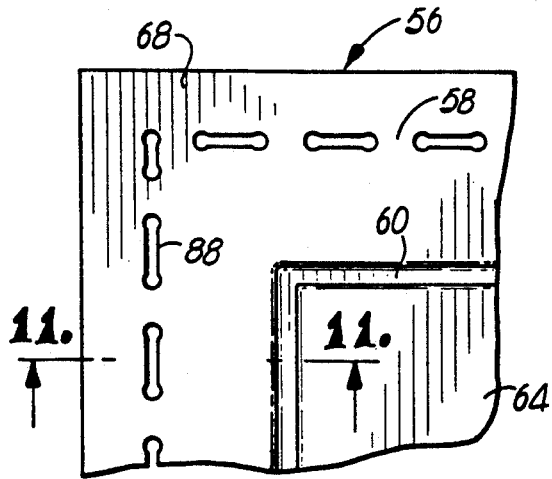
FIG. 10 is a top plan view of a third alternate embodiment of the rupture disc of the fluid pressure relief assembly of the present invention.
Figure 11:
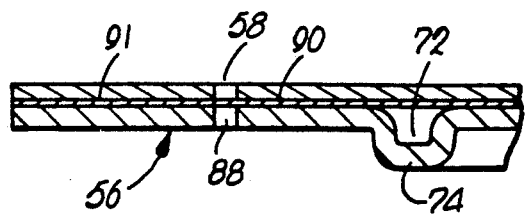
FIG. 11 is a sectional view taken along lines 11—11 of FIG. 10.

A third alternate embodiment is depicted in FIGS. 10 and 11, wherein the rupture disc 56 is shown as being square in configuration rather than circular. Similar to the embodiment shown in FIG. 6, in the example illustrated in FIG. 10 the burst pattern 58 is defined by a series of slots 88 which entirely perforate the rupture disc 56. FIG. 11 is a sectional view of this embodiment, again illustrating the "sandwich" of the rupture disc 56, strengthening material 90 and bonding material 91.

The apparatus of the present invention is illustrated in its environment in FIG. 1. The invention includes a plurality of pumps 93, 95 in series, the pumps being generally separated by a fluid flow conveying means 94, normally a pipe or tube defining a bore through which a slurry is transported. In the illustrated example, the pipe 94 includes a first opening 96 and a second opening 98 disposed respectively upstream and downstream of a pump 95. The pressure relief assembly 10 is disposed at each of said openings 96, 98, and the separate assemblies 10 are joined by a pressure relief pipe 100.

In operation, slurry containing particulate coal or other ore intermixed with water is continuously pumped, in some cases at distances of hundreds of miles, through the fluid conveying means 94 by operation of the pumps 93, 95. It is generally the case that the slurry is pumped at a pressure of 2200 psi, and in this example the relief means 16 would be continuously acted upon by backpressure of this magnitude. Therefore, the relief means 16 must be adapted to resist this level of backpressure during normal operation, and accordingly the relief means 16 is normally designed to burst at 2500 psi backpressure. In a circumstance in which the pump 95 fails, the pump 93 and all other upstream pumps will continue to function, but with the failure of the pump 95 such upstream pumps will be working against a closed system, creating the possibility of catastrophic failure of the system and resultant damage to all of its parts. However, as the slurry is forced through opening 96 and into the pressure relief assembly 10, the fluid backpressure of the slurry against the relief means 16 exceeds the safe operating maximum of 2500 psi. The relief means 16 then gives way, since it is designed to collapse at a backpressure of 2500 psi. This allows the slurry to enter into the relief pipe 100 and thence into the pressure relief assembly 10 situated at opening 98. In this case, however, it is desirable that the relief means 16 give way at a much lower forward pressure than 2500 psi, so that blockage of the slurry and potential damage to the entire system does not occur. Thus, the relief means 16 of the present invention is designed to collapse at a forward pressure of 1000 psi, thus freeing the stream of slurry to complete the safety circuit and proceed into the main fluid conveying pipe 94.

The normal operation of the relief means 16 is fully illustrated in FIGS. 4 and 5. In FIG. 4, the relief means 16 is shown to be in flow blocking position across the bore 22 of the tubular body 20. The direction of fluid flow is designated by the arrow. In this illustration, the flange 68 of the relief means 16 is so positioned that the engagement surface 48 of support structure 14 impinges against it, thus holding it against the flange 28 of the support structure 12. Annular lip 70 of the relief means 16 is disposed in recess 34, further strengthening the engagement of the relief means with the support structures 12, 14. In addition, the depressed portion 72 of strengthening element 60 of the relief means 16 is positioned within recess 32. In this disposition, relief means 16 will block fluid flow from entering bore 38.

FIG. 5 illustrates relief means 16 following exertion of fluid backpressure in excess of 2500 psi against it. The arrow indicates that the slurry has broken the relief means 16 and is now flowing into bore 38. Careful review of FIG. 5 will demonstrate that relief means 16 has broken under pressure intermediate the strengthening element 60 and the flange 68, or along the burst pattern 58.

An alternate embodiment of the present invention (not illustrated) may be constructed such that the rupture disc 56 includes a metal portion beginning at the center of dome 64 and extending outwardly in full circumference thereof to a line of termination intermediate the strengthening element 60 and the burst pattern 58. In such a configuration, the outermost portion of the rupture disc 56, including the burst pattern 58, comprises a composite material instead of annealed steel or the like. Such a composite section may be attached to the metallic portion by any suitable means, for example by welding.

In accordance with the present invention, a preferred method of constructing a fluid pressure relief assembly for a system operating under an elevated pressure includes fabricating a rupture disc 56 by cutting or blanking a section of desired material to a predetermined shape and dimensions. Normally, such material consists of annealed steel, but as disclosed herein said material may consist in part of steel and a composite material. The rupture disc 56 is then formed to include a central, frangible section and a supporting peripheral section circumscribing it.

The frangible section thus formed is strengthened in two respects simultaneously. A dome 64 is formed by the application of pressure to the central portion of the frangible section. The pressure used to form the dome 34 is preferably above the maximum pressure that the rupture disc 56 is desired to withstand, and in this case such pressure would exceed 2500 psi. At the same time, the strengthening element 60 is formed by the use of metal tooling, most commonly male and female dies employed cooperatively. In this process, as illustrated in FIG. 2, pressure is applied by male die 82 against female die 80, in such manner that the male projection 86 does not engage the bottom portion of the female recess 84, thus shaping the strengthening element 60 to have a depression 72 including a rounded lip 74. Preferably, the material comprising the rupture disc 56 is No. 316 stainless steel and has a thickness of 0.109 inches, and both the male projection 86 and the female die recess 84 have a radius of 0.030 inches. It is desirable that the depression 72 be in width at least 50% greater in dimension than the thickness of the material comprising the rupture disc 56. The strengthening element 60 is desirably disposed between the dome 64 and the flange 68 of the rupture disc 56, and its configuration strengthens the rupture disc 56 so that it will tolerate higher backpressures by transferring the stress outward to the flange 68. The flange 68 must be designed to withstand the high backpressure that the disc in general is meant to tolerate, in this instance 2500 psi.

The frangible section is weakened with respect to forward pressure by removing some of the material comprising the rupture disc 56 in a predetermined pattern between the strengthening element 60 and the flange 68. The removal of this material creates the burst pattern 58. In the preferred embodiment, the burst pattern 58 is obtained by milling a channel in the material to form a score line. It is desirable that the score line be milled or otherwise cut to a depth representing no more than two-thirds of the total thickness of the material comprising the rupture disc 56.

In the preferred embodiment, the rupture disc 56 is then installed as illustrated in FIGS. 4 and 5, and previously described herein. The rupture disc 56 is then in position to block fluid flow through the bore 22 of the tubular structure 20.

Although the invention has been described with reference to the illustrated preferred embodiment, it is noted that variations and changes may be made and equivalents employed herein without departing from the scope of the invention as recited in the claims. For example, the dome 64 may be formed of a series of sections of material, such as stainless steel, welded on top of each other.

Likewise, the invention encompasses an embodiment wherein the pressure relief means is unidirectional only. The invention in this embodiment is identical in all respects to the various alternate embodiments discussed herein, save that the pressure relief means of all such alternate embodiments are bidirectional in nature. In this unidirectional embodiment, the same method of constructing a fluid pressure relief assembly is utilized. In similar fashion, the configuration and operation of the unidirectional embodiment are exactly the same as the configuration and operation of the bidirectional embodiments, except that the relief means are designed to burst only in one direction at a predetermined pressure value. The unique feature of the invention in the unidirectional embodiment is its greatly increased strength. This is achieved by the simultaneous formation of the dome 64 and the strengthening element 60 by the method described herein. The invention thus provides a substantially strengthened pressure relief means that is comparable to conventional relief means in fabrication and configuration, but which offers great strength without resort to such expensive procedures as the use of multiple rupture discs, sealing membranes and the like.

We claim:

1. A fluid pressure relief assembly for a system operating under an elevated pressure, said assembly comprising:

support structure including means defining a bore therethrough of desired cross-sectional configuration, said structure being provided with shoulder means extending transversely into said bore and presenting a peripheral abutment surface which divides the bore into a first zone facing the surface, and an adjacent second zone which commences substantially at the innermost peripheral margin of the abutment surface;

bidirectional relief means having a certain frangile section; and means mounting the relief means across the bore of said support structure in normal flow blocking relationship thereto, a peripheral portion of the frangible section being disposed to engage said shoulder for support thereby, the central part of the frangible section within the confines of the innermost margin of said shoulder being constructed to undergo rupture only when the pressure in the first zone exceeds the pressure in the second zone by a preselected first magnitude, said peripheral portion of the frangible section which engages said shoulder being provided with means causing said frangible section to rupture when the pressure in the second zone exceeds the pressure in the first zone by a preselected second magnitude, said peripheral portion of the frangible section of said relief means supported by said shoulder being provided with means extending around a substantial part of the circumferential extent of the peripheral portion for increasing the structural integrity of said peripheral portion, said structural integrity increasing means comprising a rib extending around a substantial part of the circumferential extent of the peripheral portion of the frangible section.

2. A pressure relief assembly as set forth in claim 1, wherein said shoulder is provided with a groove for complementally receiving said rib in the circumferential extent of the peripheral portion of the frangible section.

3. A pressure relief assembly as set forth in claim 2, wherein said rib is transversely U-shaped.

4. A pressure relief assembly as set forth in claim 1, wherein said means causing said frangible section to rupture when the pressure in the second zone exceeds the pressure in the first zone by a preselected magnitude comprises a line of weakness in said peripheral portion of the frangible section.

5. A pressure relief assembly as set forth in claim 4, wherein said line of weakness comprises a groove in the peripheral portion extending around a significant part of the circumferential extent of said peripheral portion of the frangible section.

6. A pressure relief assembly as set forth in claim 4, wherein said line of weakness comprises a series of separate, spaced slots in said peripheral portion, said slots extending around a significant part of the circumferential extent of said peripheral portion of the frangible section.

7. In combination:
a first supporting structure including means defining a bore therethrough of desired cross-sectional configuration;
said first supporting structure also including, in series, means for pumping fluid through said bore at a desired velocity;
a first opening in said first supporting structure downstream of at least one said pumping means;
said opening in said first supporting structure upstream of said pumping means by a second supporting structure having means defining a bore therethrough;
a first bidirectional pressure relief means mounted across the bore of said second support structure in normal flow blocking relationship thereto intermediate said first opening and said second opening; and
a second bidirectional pressure relief means mounted across the bore of said second support structure in normal flow blocking relationship thereto intermediate said first bidirectional pressure relief means and said second opening,
said first and second bidirectional pressure relief means being adapted to function cooperatively with each other, at least one of said relief means including strengthening structure to resist bursting in a first direction up to a fluid pressure of a first predetermined magnitude, and a weakening structure to facilitate bursting in a second direction at a fluid pressure of a second predetermined magnitude;
said one bidirectional pressure relief means including a central frangible section,
the frangible section being provided with a peripheral portion disposed to engage said shoulder for support thereby,
said peripheral portion including a strengthening element extending substantially about the circumference thereof,
said strengthening element comprising a rib extending around a substantial part of the circumferential extent of the peripheral portion of the frangible section.

8. The combination as set forth in claim 7 wherein the supporting structure includes shoulder means extending transversely into said bore and presenting a peripheral abutment surface.

9. The combination as set forth in claim 7, wherein said shoulder is provided with a groove for complementally receiving said rib in the circumferential extent of the peripheral portion of the frangible section.

10. The combination as set forth in claim 7 wherein said rib is transversely U-shaped.

11. The combination as set forth in claim 7 wherein the weakening structure comprises a line of weakness in said peripheral portion of the frangible section.

12. The combination as set forth in claim 11, wherein said line of weakness comprises a groove in the peripheral portion extending around a significant part of the circumferential extent of said peripheral portion of the frangible section.

13. The combination as set forth in claim 11 wherein said line of weakness comprises a series of separate, spaced slots in said peripheral portion, said slots extending around a significant part of the circumferential extent of said peripheral portion of the frangible section.

14. A fluid pressure relief assembly for a system operating under an elevated pressure, said assembly comprising:
support structure including means defining a bore therethrough of desired cross-sectional configuration, said structure being provided with shoulder means extending transversely into said bore and presenting a peripheral abutment surface which divides the bore into a first zone facing the surface, and an adjacent second zone which commences substantially at the innermost peripheral margin of the abutment surface;
relief means having a central frangible section; and
means mounting the relief means across the bore of said support structure in normal flow blocking relationship thereto,
a peripheral portion of the frangible section being disposed to engage said shoulder for support thereby;
the central part of the frangible section within the confines of the innermost margin of said shoulder being constructed to undergo rupture only when the pressure in the first zone exceeds the pressure in the second zone by a preselected magnitude,
said peripheral portion of the frangible section of said relief means supported by said shoulder being provided with a line of weakness extending around a substantial part of the circumferential extent of the peripheral portion,
said peripheral portion of the frangible section of said relief means supported by said shoulder being provided with means extending around a substantial part of the circumferential extent of the peripheral portion for increasing the structural integrity of said peripheral portion;
said structural integrity increasing means comprising a rib extending around a substantial part of the circumferential extent of the peripheral portion of the frangible section.

15. A pressure relief assembly as set forth in claims 14, wherein said shoulder is provided with a groove for complementally receiving said rib in the circumferential extent of the peripheral portion of the frangible section.

16. A pressure relief assembly as set forth in claim 15, wherein said rib is transversely U-shaped.

17. A pressure relief assembly as set forth in claim 14, wherein said line of weakness comprises a groove in the peripheral portion extending around a significant part of the circumferential extent of said peripheral portion of the frangible section.

18. A pressure relief assembly as set forth in claim 14, wherein said line of weakness comprises a series of separate, spaced slots in said peripheral portion, said slots extending around a significant part of the circumferential extent of said peripheral portion of the frangible section.

19. In combination:
a first supporting structure including means defining a bore therethrough of desired cross-sectional configuration;
said first supporting structure also including, in series, means for pumping fluid through said bore at a desired velocity;
a first opening in said first supporting structure downstream of at least one said pumping means;
said first opening being in fluid flow communication with a second opening in said first supporting structure upstream of said pumping means by a second supporting structure having means defining a bore therethrough;
a first pressure relief means mounted across the bore of said second support structure in normal flow blocking relationship thereto intermediate said first opening and said second opening; and
a second pressure relief means mounted across the bore of said second support structure in normal flow blocking relationship thereto intermediate said first pressure relief means and said second opening,
said first and second pressure relief means being adapted to function cooperatively with each other, at least one of said relief means including strengthening structure to resist bursting up to a fluid pressure of a predetermined magnitude, and a weakening structure,
said first and second supporting structures including shoulder means extending transversely into said bore and presenting a peripheral abutment surface,
each of said pressure relief means including a central frangible section,
the frangible section including a peripheral portion disposed to engage said shoulder for support thereby,
said peripheral portion including a strengthening element extending substantially about the circumference thereof,
said strengthening element comprising a rib extending around a substantial part of the circumferential extent of the peripheral portion of the frangible section.

20. The combination as set forth in claim 19 wherein said shoulder is provided with a groove for complementally receiving said rib in the circumferential extent of the peripheral portion of the frangible section.

21. The combination as set forth in claim 20 wherein said rib is transversely U-shaped.

22. The combination as set forth in claim 19 wherein the weakening structure comprises a line of weakness in said peripheral portion of the frangible section.

23. The combination as set forth in claim 22 wherein said line of weakness comprises a groove in the peripheral portion extending around a significant part of the circumferential extent of said peripheral portion of the frangible section.

24. The combination as set forth in claim 22 wherein said line of weakness comprises a series of separate, spaced slots in said peripheral portion, said slots extending around a significant part of the circumferential extent of said peripheral portion of the frangible section.

* * * * *